US012304803B1

(12) United States Patent
Lee

(10) Patent No.: US 12,304,803 B1
(45) Date of Patent: May 20, 2025

(54) PORTABLE FUEL TANK

(71) Applicants: DUKSHIN CORP., LTD., Incheon (KR); DSK CO., LTD., Incheon (KR)

(72) Inventor: Sung Jin Lee, Seongnam-si (KR)

(73) Assignees: DUKSHIN CORP., LTD., Incheon (KR); DSK CO., LTD., Incheon (KR)

( * ) Notice: Subject to any disclaimer, the term of this patent is extended or adjusted under 35 U.S.C. 154(b) by 0 days.

(21) Appl. No.: 19/003,933

(22) Filed: Dec. 27, 2024

(30) Foreign Application Priority Data

Jan. 3, 2024 (KR) ........................ 10-2024-0000748

(51) Int. Cl.
*B67D 7/78* (2010.01)
*B67D 7/04* (2010.01)
*B67D 7/58* (2010.01)

(52) U.S. Cl.
CPC ................. *B67D 7/78* (2013.01); *B67D 7/04* (2013.01); *B67D 7/58* (2013.01)

(58) Field of Classification Search
CPC ... B67D 7/78; B67D 7/04; B67D 7/58; B67D 7/42; B67D 7/72; B67D 7/0237; B67D 7/84; B67D 7/60; B67D 7/40; B65D 25/465; B65D 25/2826; B65D 25/2894; B65D 25/42; B65D 2231/008
See application file for complete search history.

(56) References Cited

U.S. PATENT DOCUMENTS 701,755 A * 6/1902 Morris et al. .......... B65D 47/40 222/109
4,972,972 A 11/1990 Goguen
5,667,113 A * 9/1997 Clarke .................. B67D 7/845 222/530
6,068,163 A * 5/2000 Kihm ...................... B67D 7/42 222/530
6,325,251 B1 * 12/2001 Santos ..................... B25H 3/00 220/555
7,021,500 B1 4/2006 Finn et al.
10,273,056 B2 4/2019 Hoffman et al.
2010/0236658 A1 9/2010 Voss, III
2012/0018460 A1 * 1/2012 Slack ..................... B65D 25/42 222/534
2012/0318829 A1 * 12/2012 Bonner .................. B67D 7/005 222/401
2021/0114771 A1 4/2021 Winthrop et al.

FOREIGN PATENT DOCUMENTS

EP 3594175 A1 1/2020
JP 03003129 U 10/1994
JP 2002173147 A 6/2002

(Continued)

*Primary Examiner* — Vishal Pancholi
(74) *Attorney, Agent, or Firm* — You & IP, LLC

(57) ABSTRACT

Proposed is a portable fuel tank. In more detail, proposed is a portable fuel tank that enables easy discharge of fuel by coupling a fueling device including a pump and a fueling nozzle to a body, which can be carried and stores fuel therein, and that enables the fueling device to be protected by including a cover that enables the fueling device to be fixed to the body and covers the fueling device. The portable fuel tank may include a body configured to be able to store fuel therein and having a handle to be portable and a fueling device coupled to the body to supply the fuel stored in the body.

3 Claims, 13 Drawing Sheets

(56) References Cited

FOREIGN PATENT DOCUMENTS

| | | | |
|---|---|---|---|
| JP | 2015093723 | A | 5/2015 |
| KR | 20-0468258 | Y1 | 8/2013 |
| KR | 10-1752183 | B1 | 6/2017 |
| KR | 10-2020-0017455 | A | 2/2020 |
| KR | 10-2023-0003834 | A | 1/2023 |
| KR | 10-2597939 | B1 | 11/2023 |

* cited by examiner

PORTABLE FUEL TANK

CROSS REFERENCE TO RELATED APPLICATION

The present application claims priority to Korean Patent Applications No. 10-2024-0000748, filed Jan. 3, 2024, the entire contents of which are incorporated herein for all purposes by this reference.

BACKGROUND

Technical Field

The present disclosure relates to a portable fuel tank. In more detail, the present disclosure relates to a portable fuel tank that enables easy discharge of fuel by coupling a fueling device including a pump and a fueling nozzle to a body, which can be carried and stores fuel therein, and that enables the fueling device to be protected by including a cover that enables the fueling device to be fixed to the body and covers the fueling device.

Description of the Related Art

Portable containers called fuel cans are plastic structures standardized in sizes such as 10 liters or 20 liters.

Portable fuel containers are used for manually pouring fuel into small equipment such as various small facilities or generators at civil engineering construction sites, as well as stoves and boilers.

These portable fuel containers are conveniently used when there is no gas station nearby or when it is difficult to frequently visit a gas station.

However, when attempting to pour fuel into small equipment such as various small facilities or generators at civil engineering construction sites, as well as stoves and boilers using portable fuel containers that are currently widely used in the related art, it is necessary to lift the potable fuel containers to pour the fuel, which makes the fueling process difficult and inconvenient.

In particular, when refueling through a small fuel inlet such as that of a stove using portable fuel containers of the related art, it is not only inconvenient to refuel alone, but there is also a risk of spilling fuel during fueling, thus causing a problem that a fuel loss is generated and the surrounding is contaminated.

In order to solve this problem there are prior arts such as Korean Utility Model No. 20-0468258, a Korean Patent No. 10-2597939, etc.

Meanwhile, with the recent trend of increasing outdoor activities, there is a need to develop a portable fuel tank for carrying fuel required for cooking, heating, etc.

RELATED ART DOCUMENTS

Patent Documents (Patent Document 1) 1. Korean Utility Model No. 20-0468258

(Patent Document 2) 2. Korean Patent No. 10-2597939

SUMMARY

In order to solve the problems described above, an objective of the present disclosure is to provide a portable fuel tank that enables easy discharge of fuel by coupling a fueling device including a pump and a fueling nozzle to a body, which can be carried and stores fuel therein, and that enables the fueling device to be protected by including a cover member that enables the fueling device to be fixed to the body and covers the fueling device.

Another objective of the present disclosure is to provide a portable fuel tank that can increase the height of a body stacking the body on a cover member by forming a recession and a protrusion, which have shapes corresponding to each other, on a top surface of a cover member and a bottom surface of a body such that the body and the cover member can be stably stacked on each other, and that enables multiple fuel tanks to be stably stacked and carried.

In order to achieve the objectives of the present disclosure, a portable fuel tank includes: a body configured to be able to store fuel therein and having a handle to be portable; a fueling device coupled to the body to supply the fuel stored in the body; and a cover member detachably coupled to a top of the body to cover the fueling device and allowing the handle to be exposed when covering the body.

The body may have an outlet formed at a side on the top surface and connected with the inside thereof and an inlet formed at another side and connected with the inside.

The inlet may be formed to be inclined outward at a predetermined angle at the edge of the top of the body.

The fueling device may include: a pump coupled to the outlet; and a fueling nozzle connected to the pump through hose.

The body may have a holder on which the hose and the fueling nozzle of the fueling device can be held.

The holder may have holding a groove, to which the hose or the fueling nozzle can be coupled, at each of both ends.

The holder may have projections and the body may have projection grooves to which the projections are coupled.

The body may have a stepped portion formed higher than the surrounding portion at the center portion on the top surface of the body, and the handle and the outlet may be disposed at the stepped portion.

A remaining fuel groove may be formed around the stepped portion of the body.

A hose groove may be formed around the outer surface of the stepped portion of the body.

The top surface of the cover member may have the same height as the top surface of the exposed handle, and a recession and a protrusion that have shapes corresponding to each other may be formed on each of a bottom surface of the body and the top surface of the cover member such that the body and the cover member can be coupled to each other.

The cover member may have a siphon pump retainer grooves therein to which a siphon pump can be coupled.

The siphon pump retainer grooves may be formed to be positioned opposite to the position of the fueling nozzle fixed on the body.

According to the present disclosure, there are excellent effects of enabling easy discharge of fuel by coupling a fueling device including a pump and a fueling nozzle to a body, which can be carried and stores fuel therein, and of enabling the fueling device to be protected by including a cover member that enables the fueling device to be fixed to the body and covers the fueling device.

Further, there is another effect of being able to increase the height of a body stacking the body on a cover member by forming a concave portion and a protruding portion, which have shapes corresponding to each other, on a top surface of a cover member and a bottom surface of a body such that the body and the cover member can be stably stacked on each other, and of enabling multiple fuel tanks to be stably stacked and carried.

DETAILED DESCRIPTION

Embodiments described herein are provided as examples for explaining the spirit of the present disclosure. The scope of the present disclosure is not limited to the following embodiments or the detailed description of the embodiments.

In the flowing description, unless otherwise defined, all terms including technical and scientific terms used herein have the same meaning as commonly understood by those skilled in the art to which this disclosure belongs. All terms used herein are selected not to limit the scope of the present disclosure, but to make the present disclosure clearer.

The terms “comprise”, “include”, “have”, etc. used herein should be understood as open-ended terms implying the possibility of including other embodiments, unless stated otherwise in phrases and sentences including the terms.

The singular forms in the specification are intended to include the plural forms as well, unless the context clearly indicates otherwise, and which will be applied in the same way to those in claims.

Hereinafter, exemplary embodiments of a portable fuel tank according to the present disclosure will be described with reference to accompanying drawings.

Figure 1:
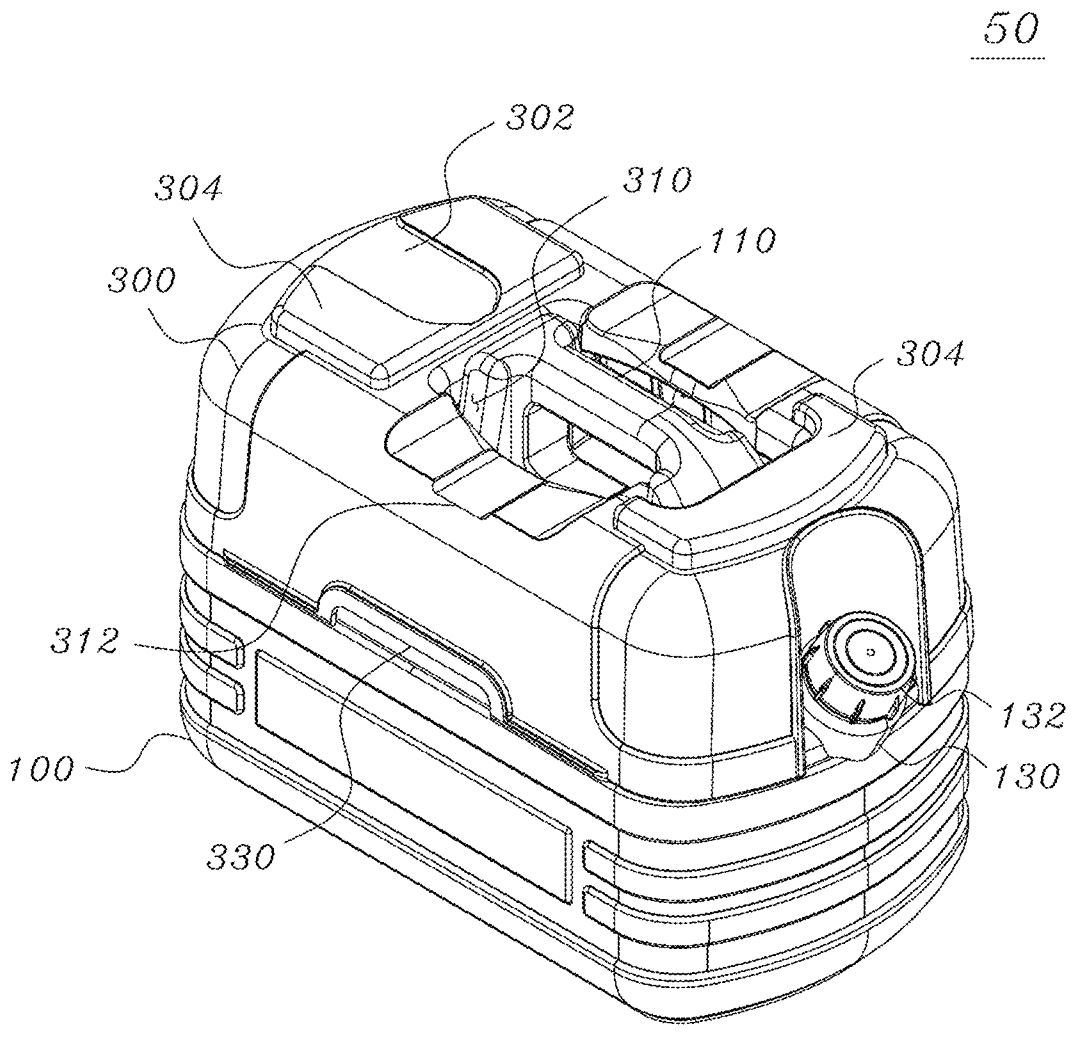
FIG. 1 is a perspective view showing a portable fuel tank according to the present disclosure.
Figure 2:
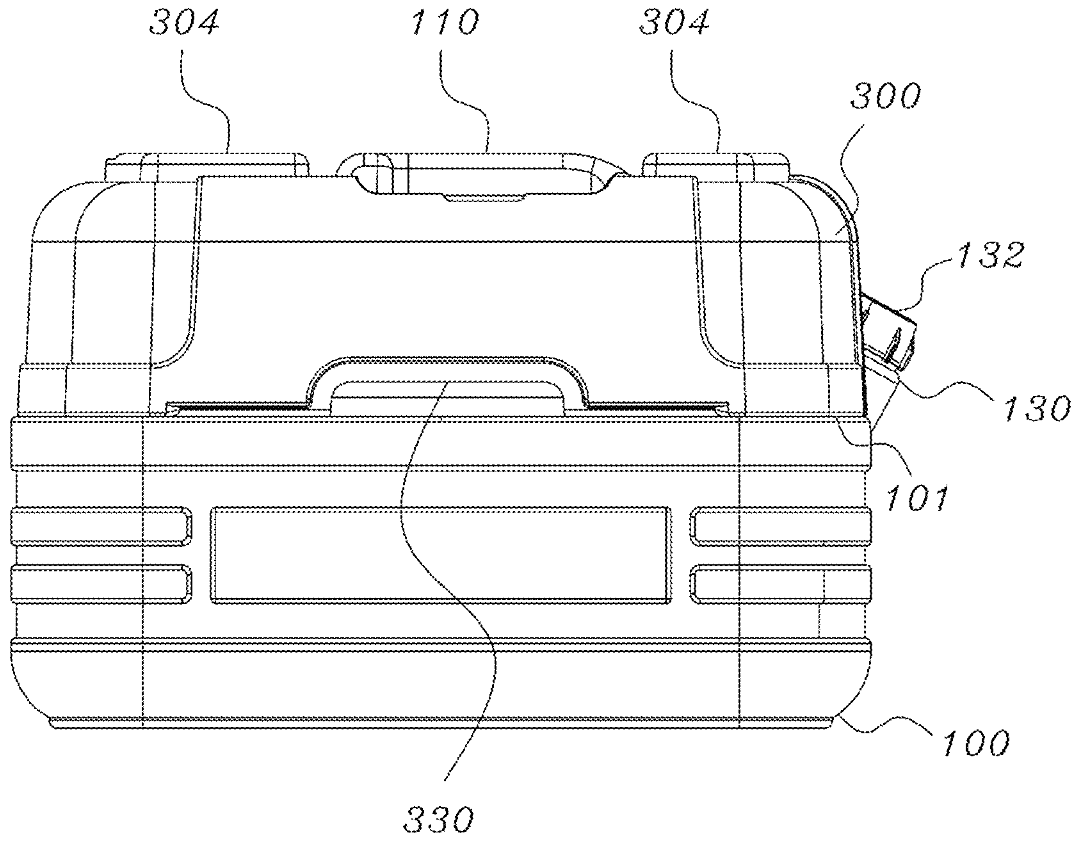
FIG. 2 is a front view of the portable fuel tank according to the present disclosure.
Figure 3:
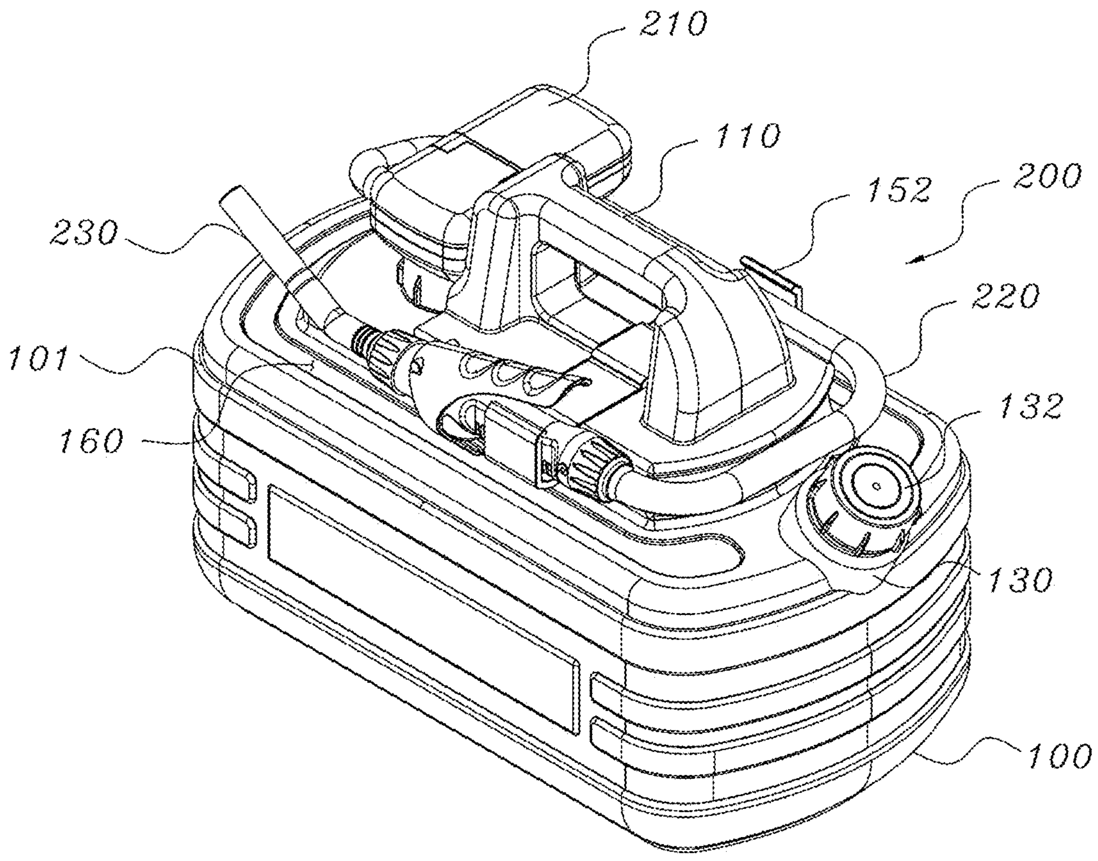
FIG. 3 and FIG. 4 are perspective views showing the state in which a cover member of the portable fuel tank according to the present disclosure has been removed.
Figure 4:
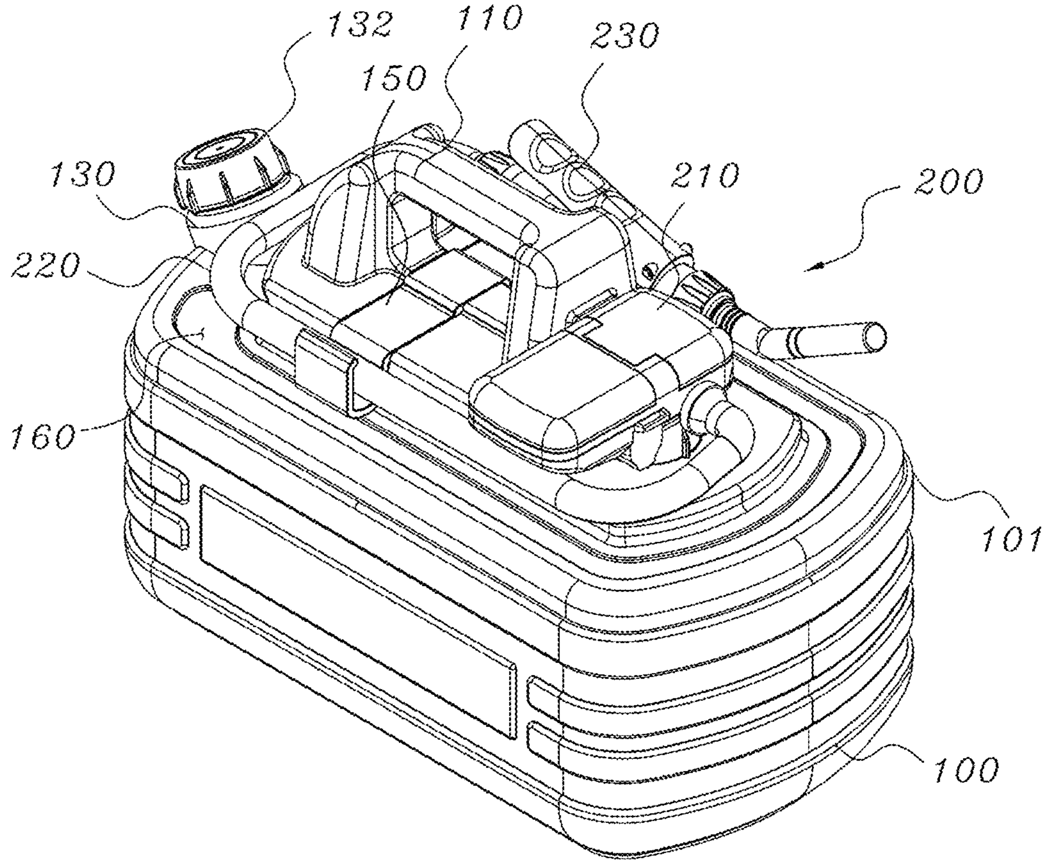
Figure 5:
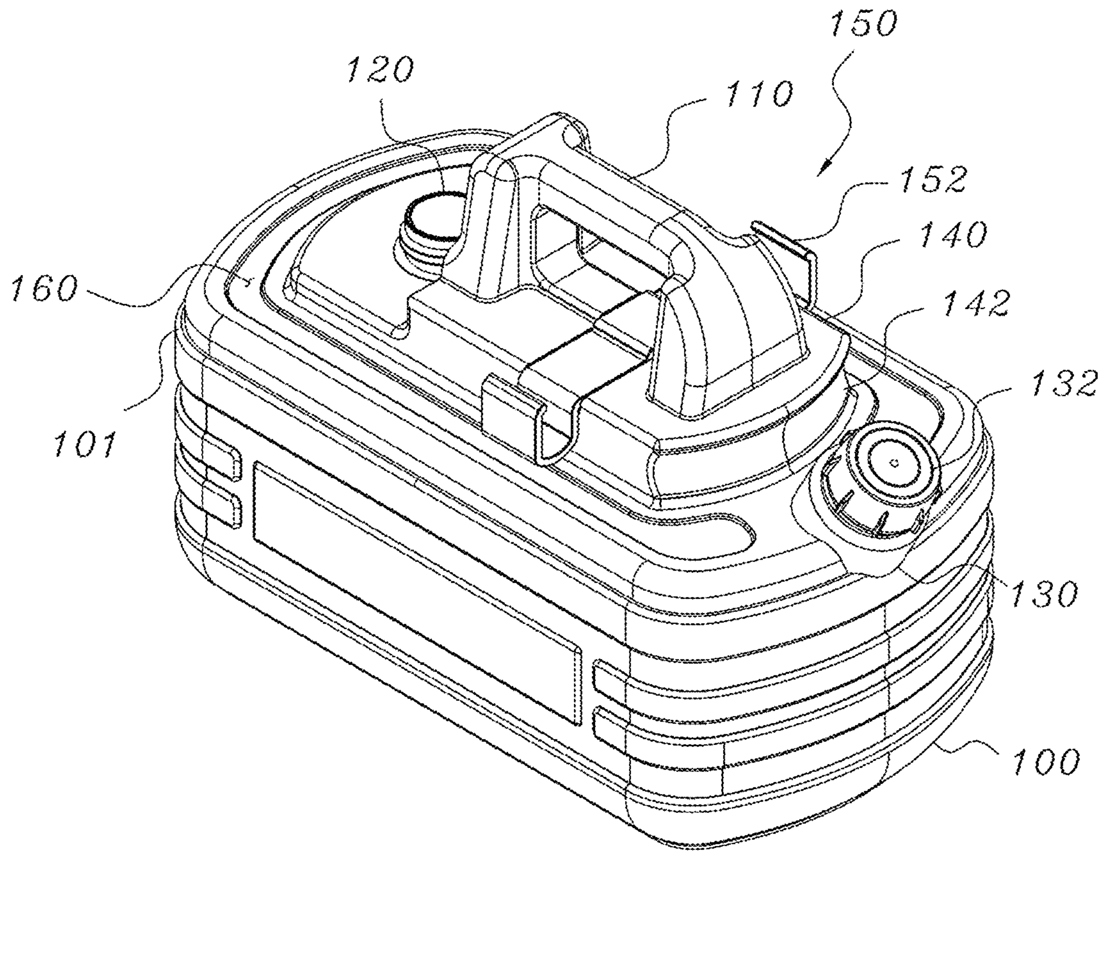
FIG. 5 and FIG. 6 are perspective views showing the state in which a fueling device has been removed in FIG. 3 and FIG. 4.
Figure 6:
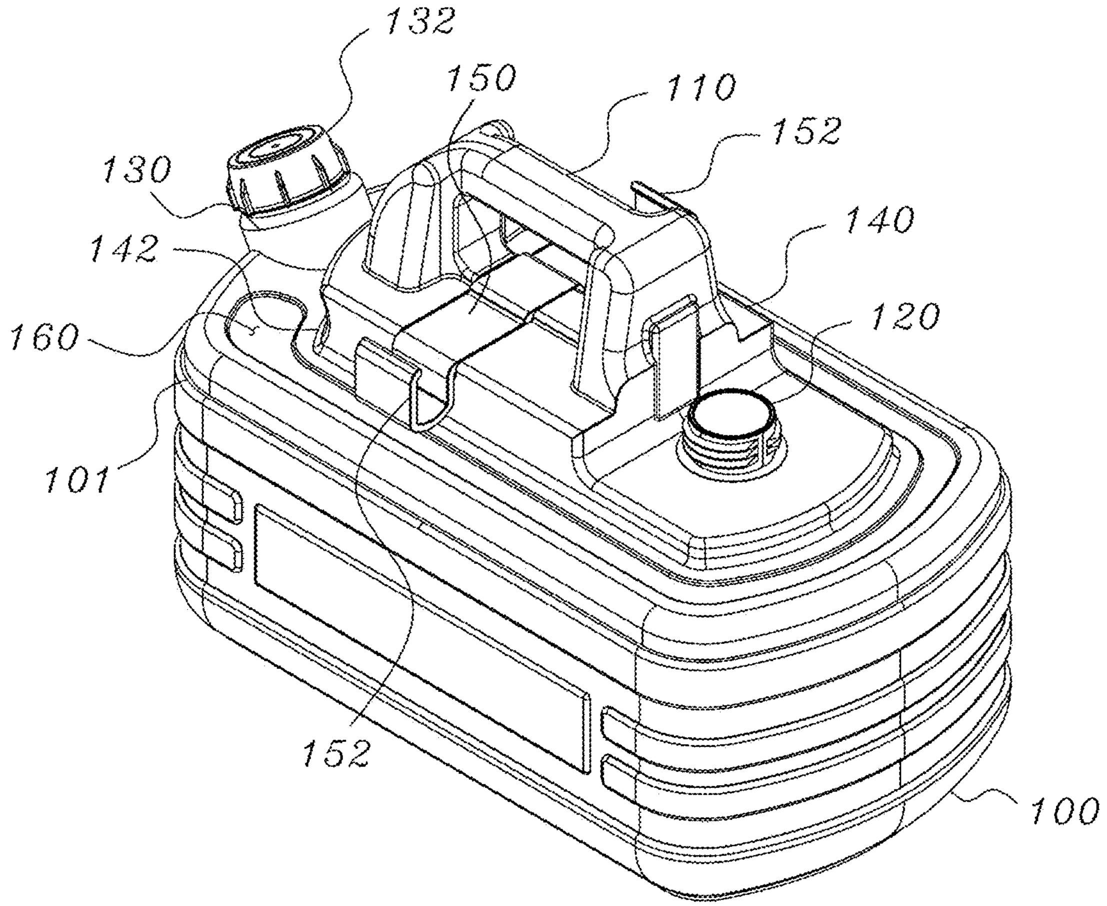
Figure 7:
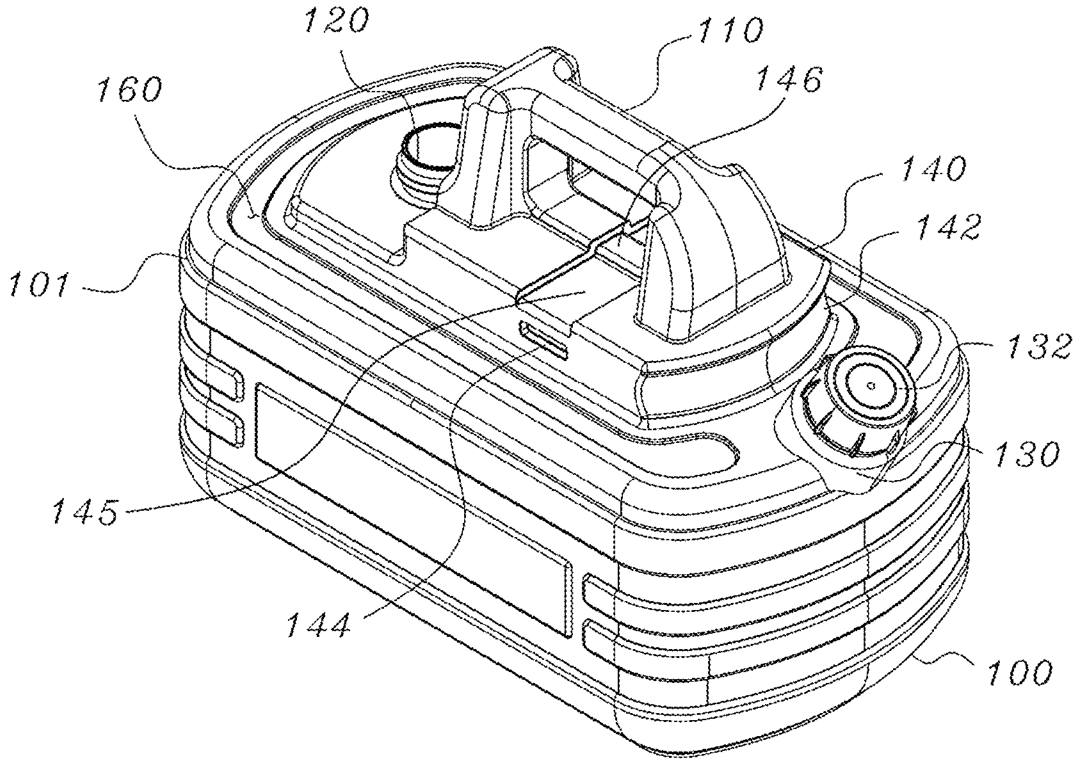
FIG. 7 and FIG. 8 are perspective views showing the state in which a holder has been removed in FIG. 5 and FIG. 6.
Figure 8:
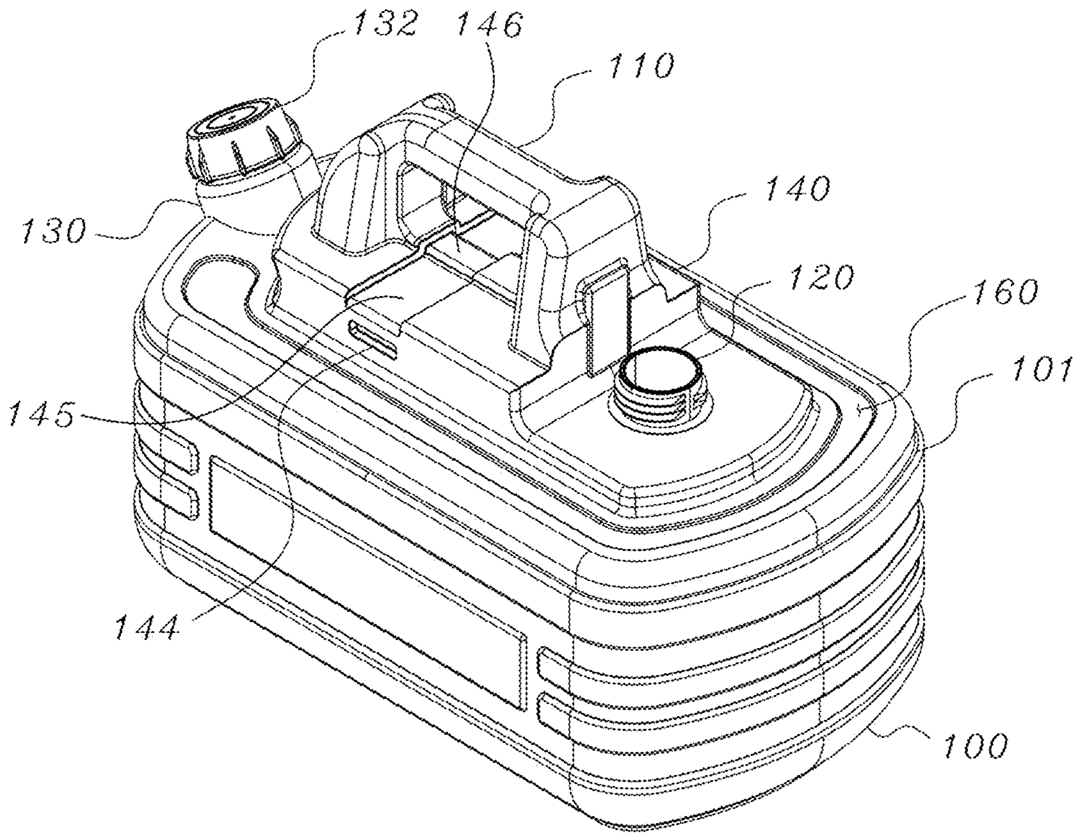
Figure 9:
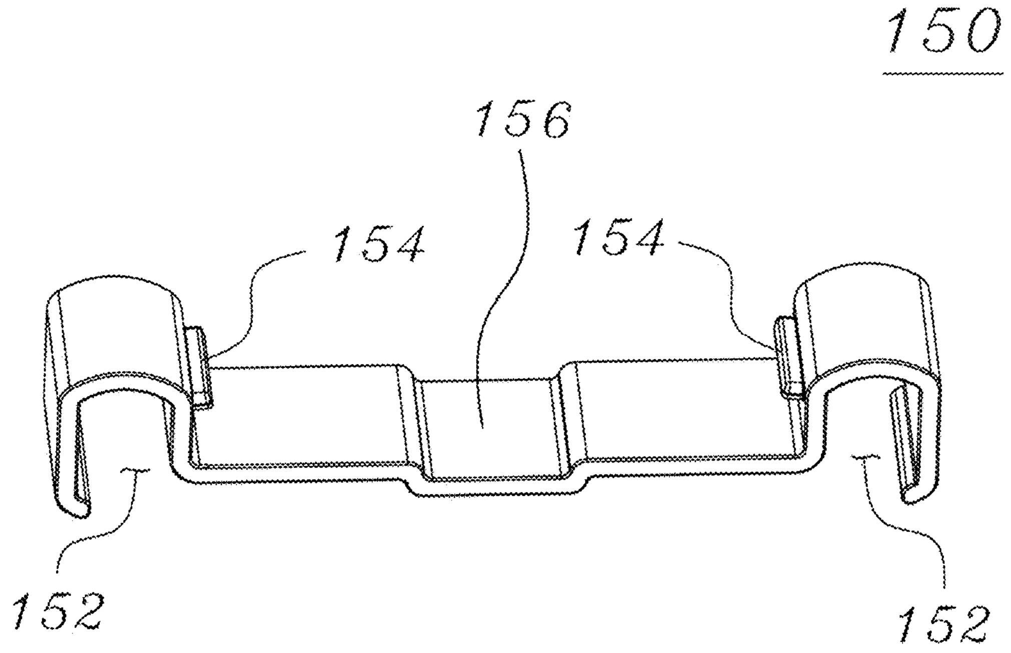
FIG. 9 is a view showing the state in which the holder of the portable fuel tank according to the present disclosure has been turned over.
Figure 10:
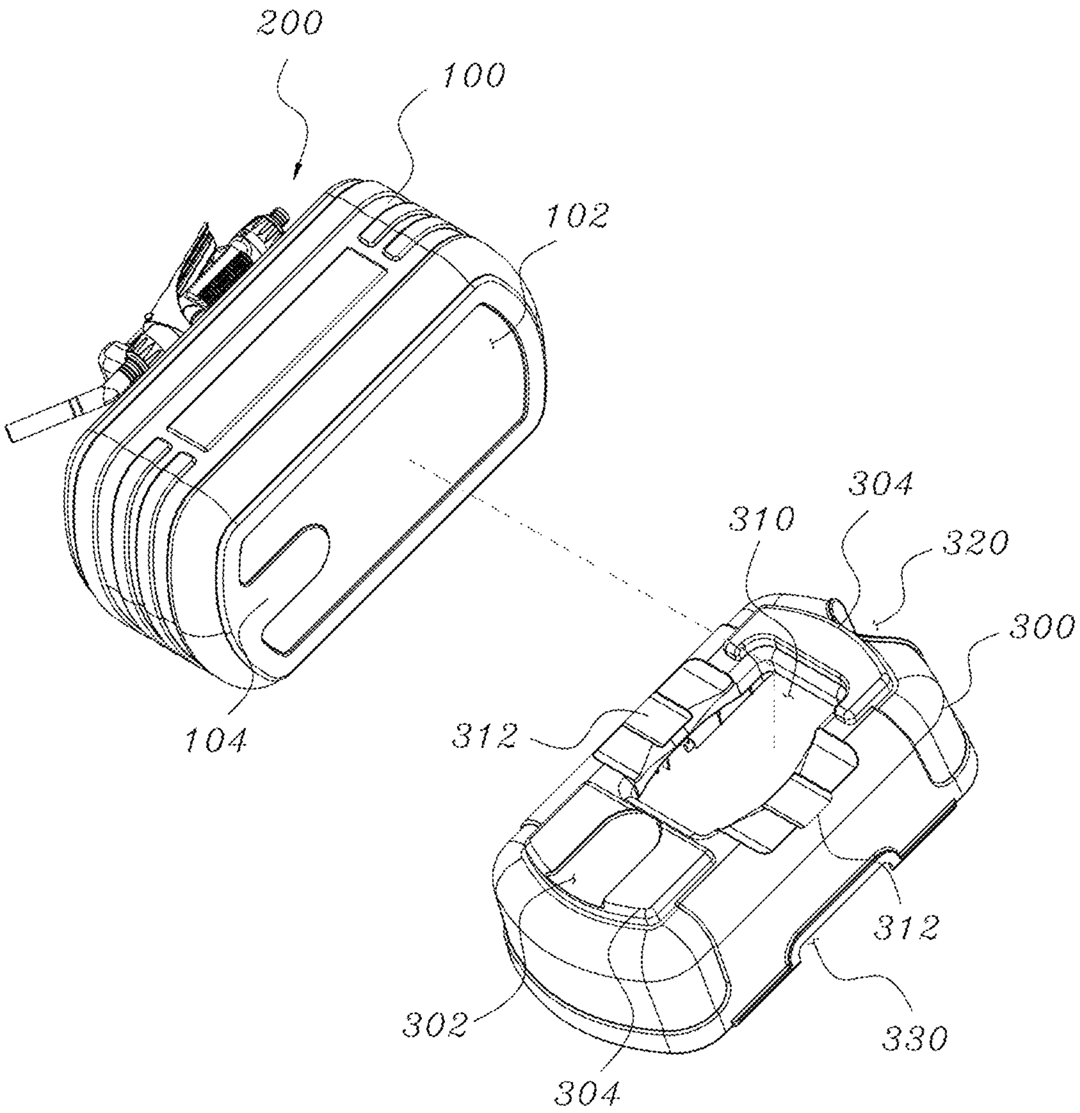
FIG. 10 is a view showing that the shapes of the cover member of the portable fuel tank according to the present disclosure and the body correspond to each other.
Figure 11:
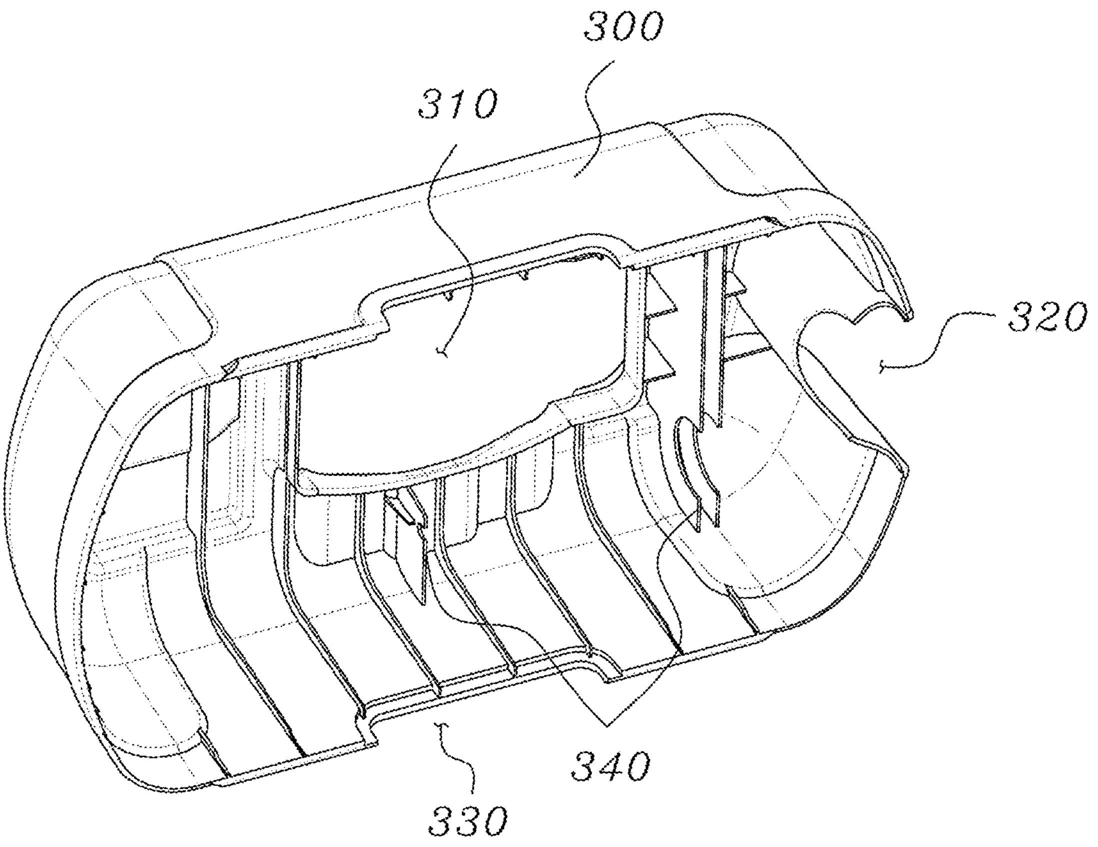
FIG. 11 is a perspective bottom view showing the cover member of the portable fuel tank according to the present disclosure.
Figure 12:
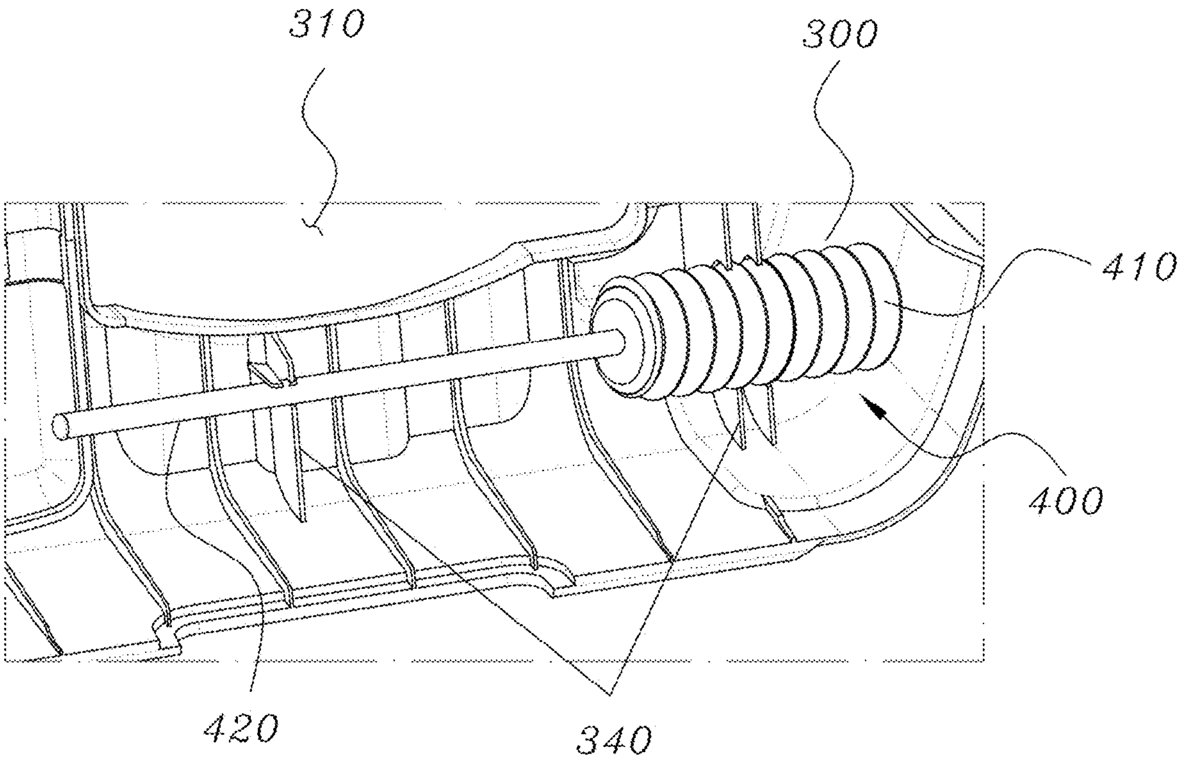
FIG. 12 is a view showing the state in which a siphon pump has been coupled to the cover member of the portable fuel tank according to the present disclosure.
Figure 13:
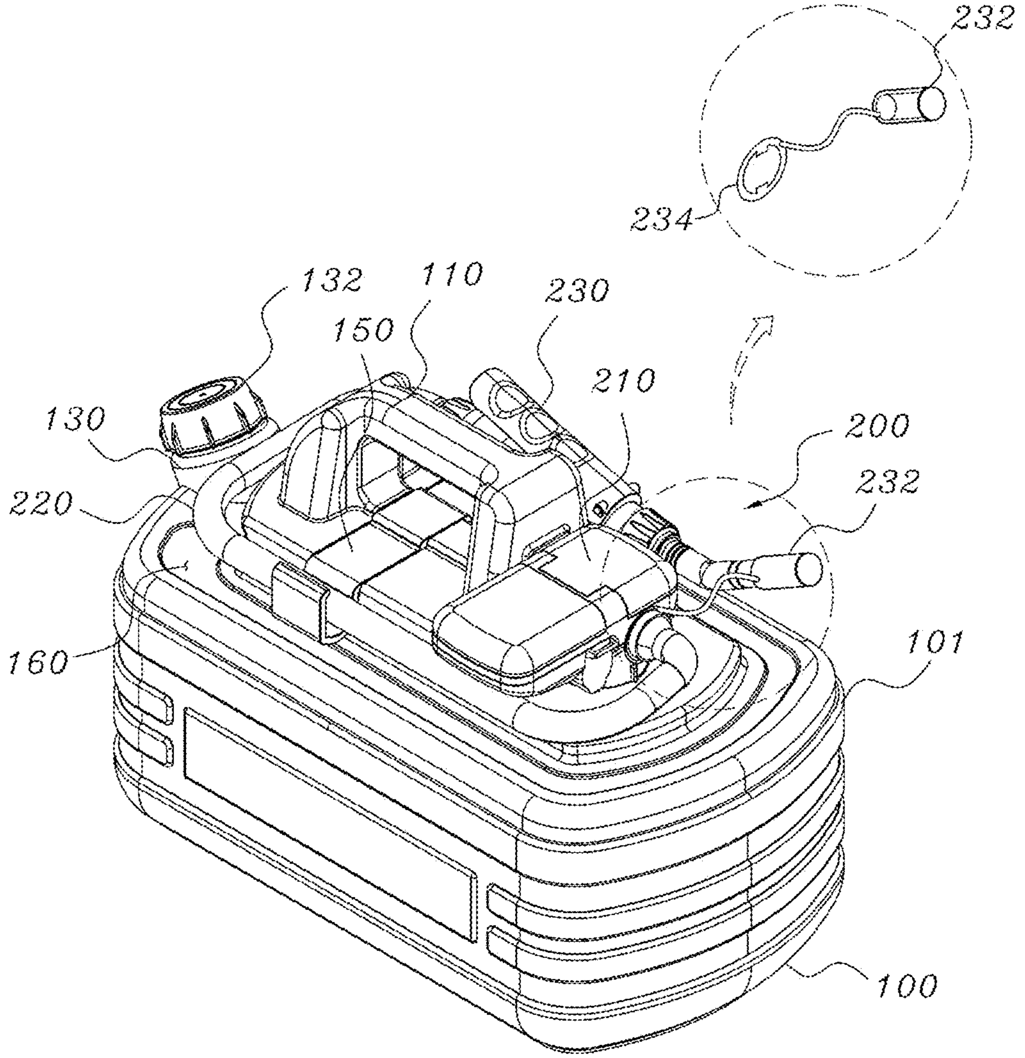
FIG. 13 is a view showing the state in which a fueling nozzle cap has been coupled to a fueling nozzle of the portable fuel tank according to the present disclosure.

FIG. 1 is a perspective view showing a portable fuel tank according to the present disclosure, FIG. 2 is a front view of the portable fuel tank according to the present disclosure, FIG. 3 and FIG. 4 are perspective views showing the state in which a cover member of the portable fuel tank according to the present disclosure has been removed, FIG. 5 and FIG. 6 are perspective views showing the state in which a fueling device has been removed in FIG. 3 and FIG. 4, FIG. 7 and FIG. 8 are perspective views showing the state in which a holder has been removed in FIG. 5 and FIG. 6, FIG. 9 is a view showing the state in which the holder of the portable fuel tank according to the present disclosure has been turned over, FIG. 10 is a view showing that the shapes of the cover member of the portable fuel tank according to the present disclosure and the body correspond to each other, FIG. 11 is a perspective bottom view showing the cover member of the portable fuel tank according to the present disclosure, FIG. 12 is a view showing the state in which a siphon pump has been coupled to the cover member of the portable fuel tank according to the present disclosure, and FIG. 13 is a view showing the state in which a fueling nozzle cap has been coupled to a fueling nozzle of the portable fuel tank according to the present disclosure.

The present disclosure relates to a portable fuel tank 50 that enables easy discharge of fuel by coupling a fueling device including a pump and a fueling nozzle to a body, which can be carried and stores fuel therein, and that enables the fueling device to be protected by including a cover member that enables the fueling device to be fixed to the body and covers the fueling device. The portable fuel tank 50, as shown in FIG. 1 to FIG. 11, includes: a body 100 that can store fuel therein and can be carried by having a handle 110; a fueling device 200 that is coupled to the body 100 to supply the fuel stored in the body 100; and a cover member 300 that detachably coupled to the top of the body 100 and covers the fueling device 200 with the handle 110 exposed. Accordingly, there is an effect that the fueling device 200 can be protected by the cover member 300 and the portable fuel tank 50 can be carried even though the cover 300 is combined because the handle 110 is exposed.

In more detail, the body 100 has an outlet 120 formed at a side on the top surface and connected with the inside thereof, and has an inlet 130 formed at another side and connected with the inside.

The inlet 130 may be formed to be inclined outward at a predetermined angle at the edge of the top of the body 100.

Accordingly, not only when fuel is injected from the outside, but when the fuel stored in the body 100 is completely discharged or fuel or a cleaning solution is discharged to clean the body 100, smooth injection or discharge is possible.

A cap 132 is provided for the inlet 130 to close the inlet 130, thereby being able to prevent volatilization of fuel.

The body 100 has a stepped portion 140 formed higher than the surrounding portion at the center portion on the top surface of the body 100, and the handle 110 and the outlet 120 can be disposed at the stepped portion 140.

The outlet 120 is vertically formed on the top surface of the body 100 such that the fueling device 200*c* can be stably installed.

The fueling device 200 may include a pump 210 coupled to the outlet 120 and a fueling nozzle 230 connected to the pump 210 through a hose 220.

The fueling device 200 including the pump 210, the hose 220, and the fueling nozzle 230 is a component for discharge fuel stored in the body 100 to a fueling target such as a stove or a heater among camping equipment and is well known in the art, so it is not described in detail.

However, the body 100 has a holder 150 on which the hose 220 and the fueling nozzle 230 of the fueling device 200 can be held, so the fueling device 200 can be coupled and stowed in a fixed state on the top surface of the body 100.

The holder 150 is disposed at the stepped portion 140 of the body 100 perpendicularly to the longitudinal direction of the handle 110. The holder 150 may have holding a groove 152, in which the hose 220 or the fueling nozzle 230 can be held, at each of both ends.

Accordingly, the hose 220 connected to the pump 210 is held in the holding groove 152 at an end of the holder 150 and the fueling nozzle 230 is held in the holding groove 152 at the other end of the holder 150 with the hose 220 disposed around the stepped portion 140, whereby the fueling device 200 is held and stowed.

A hose groove 142 is formed around the outer surface of the stepped portion 140, so when the hose 220 and the fueling nozzle 230 are held on the holder 150, the soft hose 220 connecting the pump 210 and the fueling nozzle 230 can be fixed in close contact with the hose groove 142 at the stepped portion 140.

The holder 150 may have projections 154 formed on the inner surfaces corresponding to the stepped portion 140 and projection grooves 144 to which the projections 154 are coupled may be formed at the stepped portion 140 of the body 100.

Accordingly, the projections 154 are fitted in the projection grooves 144, whereby the holder 150 can be detachably coupled to the stepped portion 140.

A coupling groove 145 is formed on the stepped portion 140 so that both ends of the holder 150 in the width direction can be supported, so movement of the holder 150 in the width direction can be prevented.

A stepped protrusion 146 is formed in center portion of the coupling groove 145 such that the edge portion to be higher than the edge portions and a stepped groove 156 corresponding to the stepped protrusion 146 is formed at the holder 150, whereby the holder 150 can be more firmly installed and maintained in the state on the stepped portion 140 without moving.

A remaining fuel reception groove 160 may be formed around the stepped portion 140 on the body 100.

Accordingly, when fuel that may flow out of the supply nozzle 230 during fueling is received in the remaining fuel reception groove 160, so the fuel is prevented from flowing down on the side of the body 100, whereby there is an effect of being able to more neatly manage the body 100.

The body 100 is formed in a box shape with predetermined length and width so that the fueling nozzle 230 including the hose 220 can be held on the body 100, as described above.

The cover member 300 is seated to cover the body 100 and a step 101 in which the bottom of the cover member 300 is seated is formed at the body 100, whereby the cover member 300 is seated on the step 101.

A holding groove 330 is formed at the bottom of the cover member 300, so the holding groove 330 can be used to hold the cover member 300 and place the cover member 300 on the body 100 or remove the cover member 300.

As shown in FIG. 1 and FIG. 2, the cover member 300 has a first open hole 310 at the center portion so that the handle 110 can be exposed when the cover member 300 is coupled to the body 100, and concave grooves 312 are formed in the width direction of the first open hole 310, so it is possible to hold the handle 110 even with the cover member 300 coupled to the body 100.

A second open hole 320 is formed on a side of the cover member 300 such that the inlet 130 is exposed out of the cover member 300, so it is possible to use the inlet 130 even with the cover member 300 coupled to the body 100.

The top surface of the cover member 300 is formed with the same height as the top surface of the exposed handle 110, whereby the cover member 300 and the body 100 can be stacked on each other.

A recession and a protrusion which have corresponding shapes may be formed on each of the bottom surface of the body 100 and the top surface of the cover member 300 to be fitted to each other.

That is, as shown in FIG. 10, a first protrusion 304 is formed on the top surface of the cover member 300 and a concave recession 302 is formed on a partial surface of the first protrusion 304.

A second recession 102 corresponding to the outer edge shape of the first protrusion 304 is formed on the bottom surface of the body 100 and a second recession 104 corresponding to the outer edge shape of the first recession 302 is formed on the bottom surface of the body 100.

Accordingly, when the cover member 300 and the body 100 are stacked on each other, the first recession and the second protrusion 302 and 104 and the first protrusion and the second recession 304 and 102 are fitted to each other such that the cover member 300 and the body 100 can be stably stacked on each other, whereby there is an effect that it is possible to stably stack and stow or carry multiple fuel tanks 50.

In this case, a separate strap (not shown) may be provided to be able to prevent unexpected separation of the body 100 and the cover member 300 by fixing the outer sides of the body 100 and the cover member 300

In particular, the strap (not shown) can be fixed in close contact with the groove 312 while surrounding both of the body 100 and the cover member 300 and there is an effect of being able to fix the fuel tank 50 of the present disclosure without shaking in a stacked state over two or more stages.

The strap (not shown) may have a structure enabling adjustment of the length and both ends thereof can be fixed by coupling members such as Velcro, snap buttons, or buckles.

It is also possible to increase the height of the body 100 from the ground in use, depending on the fueling environment, by placing the body 100 on the cover member 300 using the cover member 300 as a base.

Siphon pump retainers 340 in which a siphon pump 400 can be retained may be provided inside the cover member 300.

The siphon pump 400 is a tool that can supply fuel instead of the fueling nozzle 230 when it is difficult to use the fueling nozzle 230, depending on fueling targets. As shown in FIG. 11 and FIG. 12, the siphon pump retainers 340 may be provided as a pair having grooves with different sizes so that the pump section 410 and the tube section 420 of the siphon pump 400 can be stably coupled.

The siphon pump retainers 340 may be formed to be positioned opposite to the position of the fueling nozzle 230 fixed on the body 100 to prevent interference between the fueling nozzle 230 and the siphon pump 400 when the cover member 300 is coupled to the body 100.

As shown in FIG. 13, a fueling nozzle cap 232 that is coupled to the end of the fueling nozzle 230 may be further provided.

The fueling nozzle cap 232 is coupled to the end of the fueling nozzle 230 through which fuel is discharged, thereby being able to prevent remaining fuel in the fueling nozzle 230 from flowing down and contaminating the body 100 after fueling.

The fueling nozzle cap 232 may have a ring 234 connected to a connection string at a side and when the ring 234 is coupled to the outer side of the outlet 120 or the hose 220, there is an effect of being able to prevent separation and loss of the fueling nozzle cap 232.

Therefore, according to the portable fuel tank 50 according to the present disclosure described above, it is possible to enable easy discharge of fuel by coupling a fueling device including a pump and a fueling nozzle to a body that can be carried and stores fuel therein and it is possible to protect the fueling device by including a cover member that enables the fueling device to be fixed to the body and covers the fueling device. Further, since a recession and a protrusion that have shapes corresponding to each other are formed on each of the top surface of the cover member and the bottom surface of the body such that the cover member and the body can be stably stacked on each other, whereby there are several advantages such as the ability to increase the height of the body by placing the body on the cover member and the ability to stably stack and store or transport multiple fuel tanks.

Although the embodiments described above describe only most preferable examples of the present disclosure and the present disclosure is not limited to the embodiments described above and it is apparent to those skilled in the art that the present disclosure may be modified in various ways without departing from the spirit of the present disclosure.

The present disclosure relates to a portable fuel tank. In more detail, the present disclosure relates to a portable fuel tank that enables easy discharge of fuel by coupling a fueling device including a pump and a fueling nozzle to a body, which can be carried and stores fuel therein, and that enables the fueling device to be protected by including a cover that enables the fueling device to be fixed to the body and covers the fueling device.

What is claimed is:

1. A portable fuel tank comprising:
- a body configured to be able to store fuel therein and having a handle to be portable;
- a fueling device coupled to the body to supply the fuel stored in the body; and
- a cover member detachably coupled to a top of the body to cover the fueling device and allowing the handle to be exposed when covering the body,
- wherein a top surface of the cover member has the same height as a top surface of the exposed handle, and
- a recession and a protrusion that have shapes corresponding to each other are formed on each of a bottom surface of the body and the top surface of the cover member such that the body and the cover member can be coupled to each other.

2. The portable fuel tank of claim 1, wherein the fueling device comprises:
- a pump coupled to the body; and
- a fueling nozzle connected to the pump through a hose.

3. The portable fuel tank of claim 2, wherein the body has a holder on which the hose and the fueling nozzle of the fueling device can be held.

* * * * *